United States Patent [19]
Suh

[11] Patent Number: 5,508,739
[45] Date of Patent: Apr. 16, 1996

[54] WHITE-BALANCE ADJUSTING APPARATUS AND A METHOD THEREOF FOR A VIDEO CAMERA

[75] Inventor: Sang W. Suh, Seoul, Rep. of Korea

[73] Assignee: Goldstar Co., Ltd., Seoul, Rep. of Korea

[21] Appl. No.: 360,429

[22] Filed: Dec. 21, 1994

[30] Foreign Application Priority Data

Dec. 22, 1993 [KR] Rep. of Korea .................. 29005/1993

[51] Int. Cl.$^6$ ........................................... H04N 9/73
[52] U.S. Cl. ........................ 348/223; 348/225; 348/226
[58] Field of Search .................................. 348/223, 225, 348/226, 227, 228, 655, 656, 657; 358/29, 29 C; H04N 9/73

[56] References Cited

U.S. PATENT DOCUMENTS

| | | | |
|---|---|---|---|
| 5,038,205 | 8/1991 | Kondo | 348/225 |
| 5,146,316 | 9/1992 | Suzuki | 348/227 |
| 5,198,890 | 3/1993 | Suga | 348/223 |

Primary Examiner—James J. Groody
Assistant Examiner—Sherrie Hsia

[57] ABSTRACT

An improved white-balance adjusting apparatus and a method thereof for a video camera capable of automatically varying a white-balance trace region in accordance with a change in color temperatures of a light source and of performing an automatic white-balance adjusting operation. The apparatus includes a dividing circuit for integrating a first primary color signal for a predetermined time and for computing an integration value ratio of a second primary color signal in response to the integration value ratio of the first primary color signal; a color temperature detection circuit for detecting a color temperature change of a light source from the integration value ratio; and a gain computation circuit, when an integration value ratio is within a range of at least one white-balance trace region, for selecting a white-balance trace region in accordance with a detected color temperature change and for computing a gain of a primary color in accordance with the integration value ratio in a range of a selected white-balance trace region.

8 Claims, 5 Drawing Sheets

FIG. 5

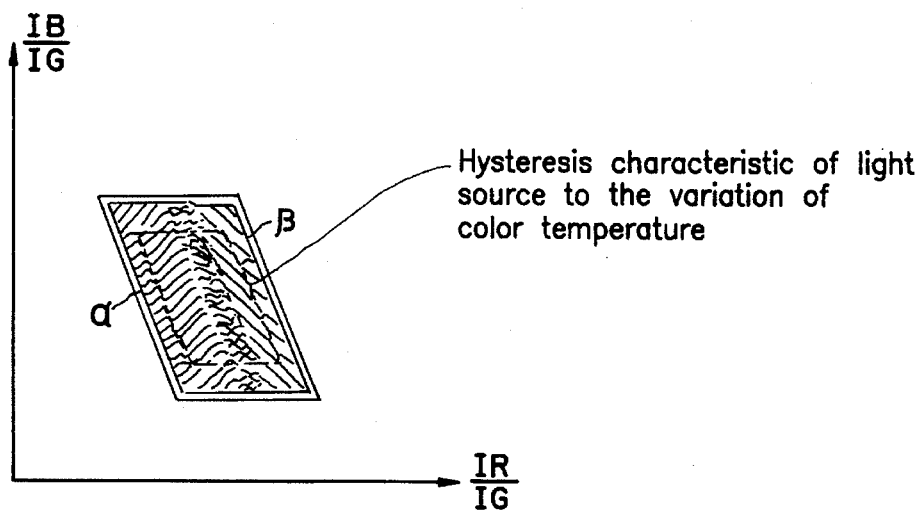

Hysteresis characteristic of light source to the variation of color temperature

FIG. 6

| SI1 | SI2 | changes of color temperature | selected white balance trace region |
|---|---|---|---|
| H | H | no changes of color temperature | white balance trace region (α+β) |
| H | L | High color temperature → Low color temperature | white balance trace region (α) |
| L | H | Low color temperature → High color temperature | white balance trace region (β) |
| L | L | no changes of color temperature | white balance trace region (α+β) |

WHITE-BALANCE ADJUSTING APPARATUS AND A METHOD THEREOF FOR A VIDEO CAMERA

BACKGROUND OF THE INVENTION

1. Field of the Invention

The present invention relates to a white-balance adjusting apparatus and a method thereof for a video camera, and particularly to an improved white-balance adjusting apparatus and a method thereof for a video camera capable of automatically varying a white-balance trace region in accordance with a change of color temperatures of a light source and performing an automatic white-balance adjusting operation.

2. Description of the Conventional Art

Conventionally, when an object is taken for a picture using a camera, every light from the object has its specific color temperature. However, when the image signals of the white color, for example, are displayed on a screen of a television set as a white color, there is a factor of controlling the strength of the primary color signals based on the white color. In this case, we call the factor a white-balance.

Referring to FIG. 1, as shown therein, a conventional white-balance adjusting apparatus for a video camera includes a charge coupled device (CCD) for imaging the light of an object passed through a lens system 1 and for converting the light into electrical signals, a sample/hold, color split and automatic gain control circuit 3 for splitting the electrical signal passed from the CCD 2 into the signals S1 to S3 of yellow Y, green G, and cyan Cy of three channels and for controlling the gains of the three channels, a first operation circuit 4 for converting the signal obtained from the sample/hold, color split and automatic gain control circuit 3 to primary color signals of R, G, B of the three channels, an integration circuit 9 for computing the integration values IR, IG, and IB obtained by integrating the primary color signal outputted from the first operation circuit 4 for a time of a field, a divide circuit 13 for dividing the values integrated at the integration circuit 9 by the values of IR/IG and IG/IB, a gain computation circuit 16 for comparing the values outputted from the divide circuit 4 with a previously stored value and for outputting the gain control signals in accordance with the compared values, a variable gain circuit 5 for amplifying the output level of the primary color signal outputted from the first operation circuit 4 in accordance with the gain control signal obtained at the gain computation circuit 16, a second operation circuit 17 for operating the primary color signal, the gain of which is controlled at the variable gain circuit 5, and for converting the operated signals to the color difference signal R-Y and B-Y, and an encoding circuit 18 for encoding the chrominance signal R-Y and B-Y obtained at the second operation circuit 17 and the luminance signal Y outputted from the external terminal 19.

The detailed operation of the conventional white-balance control apparatus for the video camera will now be explained with reference to FIGS. 1 to 3.

To begin with, when the light image from an object is inputted into the CCD 2, the image is converted into the electrical signals at the CCD 2. The electrical image signal is applied to the sample/hold, color split and automatic gain control circuit 3.

In the sample/hold, color split and automatic gain control circuit 3, the signal outputted from the CCD 2 is split into the signals of Yellow Ye, Green G, and Cyan Cy. Thereafter, the split signals are applied into signals S1 to S3 of three channels of Ye, G, and Cy and then the split channel signal S1 to S3 are controlled to a predetermined gain. Thereafter, the channel signals S1 to S3 are converted to R, G, and B of the primary color signal at the first operation circuit 4 and applied to the variable gain circuit 5 and the integration circuit 9, respectively.

In the integration circuit 9 comprising of first to third integrator 10 to 12, a red color signal R outputted from the first operation circuit 4 is integrated at the first integrator 10 during one field. A green color signal G outputted therefrom is integrated at the second integrator 11 during one field. A blue color signal B outputted therefrom is integrated at the third integrator during one field. Therefore, the integration values IR, IG, and IB in which R, G, and B are integrated by the first to third integrator 10 to 12 are computed and then outputted to the divide circuit 13.

In a first divider 14 of the divide circuit 13, the output signals IR and IG of the first integrator 10 and the second integrator 11 are respectively divided and then the ratio IR/IG is obtained. In addition, in a second divider 15 of the divide circuit 13, the output signals IG and IB of the second integrator 11 and the third integrator 12 are divided and then the ratio IB/IG is obtained. The output signals IR/IG and IB/IG are applied to the gain computation circuit 16.

An integration value ratio IR0/IG0 of an integration value IR0 for a primary red color signal R and an integration value IG0 for a primary green color signal G and an integration value ratio IB0/IG0 of an integration value IB0 for a primary blue color signal B and an integration value IG0 for a primary green color signal G are previously stored in the gain computation circuit 16, so that a curve black body locus CBL is set up based on the above values as shown in FIG. 2. The curve black body locus CBL, as shown in FIG. 2, presents that if one value of the integration value ratio IR/IG obtained at the divide circuit 13 increases, the other value decreases. That is, if the value IR/IG increases, the value IB/IG decreases, and if the value IR/IG decreases, the value IB/IG increases. In addition, if the value IB/IG increases, the corresponding color temperature is high, and if the value IR/IG is high, the corresponding color temperature is low. The white-balance trace regions A1 and A2 are set up at both sides of the curve black body locus CBL, in which if the value IR/IG and IB/IG outputted from the divide circuit 13 are within a range of white-balance trace regions A1 and A2, the white-balance adjustment is performed, whereby the white-balance is automatically performed.

Therefore, in the gain computation circuit 16, whether or not the integration value ratios IR/IG and IB/IG of the primary color signal for the actual image data which are obtained at the divide circuit 13, are within a range of the white-balance trace regions A1 and A2 do judged. If the integration value ratios IR/IG and IB/IG is not fall within a range of the white-balance trace regions A1 and A2, the white-balance adjustment operation is not performed the gains of the first and second variable gain amplifiers 6 and 7 of the variable gain circuit 5, which received the primary color signals R and B from the first operation circuit 4, retain the primary color state. On the contrary, the integration value ratios IR/IG and IB/IG do not fall within a range of the white-balance trace regions A1 and A2, the primary color signals R and B are computed based on the integration ratios IR/IG and IB/IG. The gains computed thereby are applied to the first and third variable amplifiers 6 and 8 of the variable gain circuit 5 as the control signals SGR and SGB, respectively. Here, for example, the gain of the second variable amplifier 7 of the variable gain circuit 5 is previously set as 1.

Thereafter, the control signals SGR and SGB of the gain computation circuit 16 are inputted into the first and third gain amplifiers 6 and 8 of the variable gain circuit 5 to control each of gains thereof. Therefore, in the first through third variable gain amplifiers 6 to 8 of the variable gain circuit 5, the output level of the primary color signals R, G, and B outputted from the first operation circuit 4 establish a relation as "R:G:B=1:1:1" by the control signals SGR and SGB, whereby the white-balance is achieved. In addition, the gain of the gain computation circuit 16 controls the integration value ratio of each of the primary color signals to meet the following condition.

$$(IR/IG)=(IB/IG)=1$$

In addition, the primary color signals R, G, and B outputted from the variable gain circuit 5 are converted to the color difference signals R-Y and B-Y at the second operation circuit 17 and the converted signals are applied to the encoding circuit 18. The encoding circuit 18 converts the signals applied thereto into the color video signal SVD of a NTSC type using the luminance signal Y outputted from the external terminal 19 and the color difference signals R-Y and B-Y obtained at the second operation circuit 17.

However, generally the integration value ratio 1R/IG and IB/IG of the primary color signals do not obtain the same trace curve between a first trace curve A3 obtained when the light source of the low color temperature moves toward the light source of the high color temperature and a second trace curve A4 obtained when the light source of the high color temperature moves toward the light source of the low color temperature. Instead of the same curve, it creates a hysteresis-like curve. Then the white-balance adjusting operation can be obtained only when the white-balance trace region includes the region of the first trace curve A3 and the second trace curve A4. Therefore, in this case, where the trace region becomes wide, the white-balance adjusting operation cannot be advantageously performed because the white color signal cannot be correctly judged as the white color signal, and the malfunction occurs thereby.

SUMMARY OF THE INVENTION

Accordingly, it is an object of the present invention to provide a white-balance adjusting apparatus and a method thereof for a video camera.

It is another object of the present invention to provide an improved white-balance adjusting apparatus and a method thereof for a video camera, capable of automatically varying a white-balance trace region in accordance with a change of color temperature of a light source and performing an automatic white-balance adjusting operation.

To achieve the above objects, the white-balance adjusting apparatus and a method thereof for a video camera include a dividing circuit for integrating a first primary color signal for a predetermined time and for computing an integration value ratio of a second primary color signal in response to the integration value ratio of the first primary color signal; a color temperature detection circuit for detecting a color temperature change of a light source from the integration value ratio; and a gain computation circuit, when an integration value ratio is within a range of at least one white-balance trace region, for selecting a white-balance trace region in accordance with a detected color temperature change and for computing a gain of a primary color in accordance with a the integration value ratio in a range of a selected white-balance trace region.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein:

FIG. 5 is a graph showing an example of a white-balance trace region according to the present invention.

FIG. 6 is a table showing characteristics changed by a comparator in accordance with a change of a color temperature of a light source and of a white-balance trace region selected thereby.

DETAILED DESCRIPTION OF THE PREFERRED EMBODIMENTS

Figure 4:
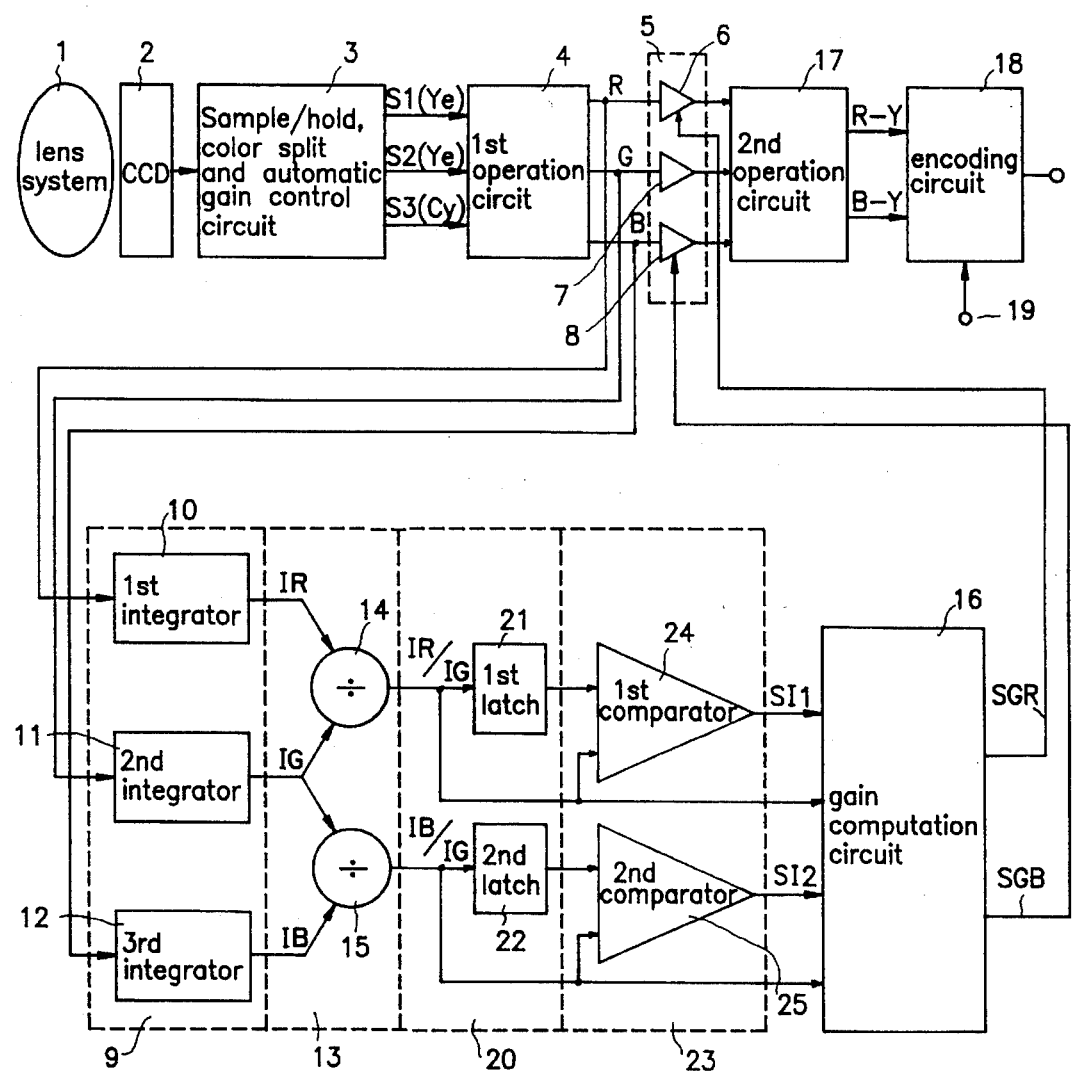
FIG. 4 is a block diagram showing an embodiment of a white-balance adjusting apparatus for a video camera according to the present invention.

FIG. 4 shows a structure of a white-balance adjusting apparatus for a video camera according to an embodiment of the present invention. As shown therein, the white-balance adjusting apparatus for a video camera includes a latch circuit 20 for holding integration value ratios IR/IG and IB/IG obtained at a divide circuit 13 for the time of one field and a comparing circuit 23, serially connected between the divide circuit 13 and a computation circuit 16, for comparing integration value ratios (IR/IG)p and (IB/IG)p outputted after a predetermined hold at the latch circuit 20 with the integration value ratios 1R/IG and IB/IG for a current field.

Figure 1:
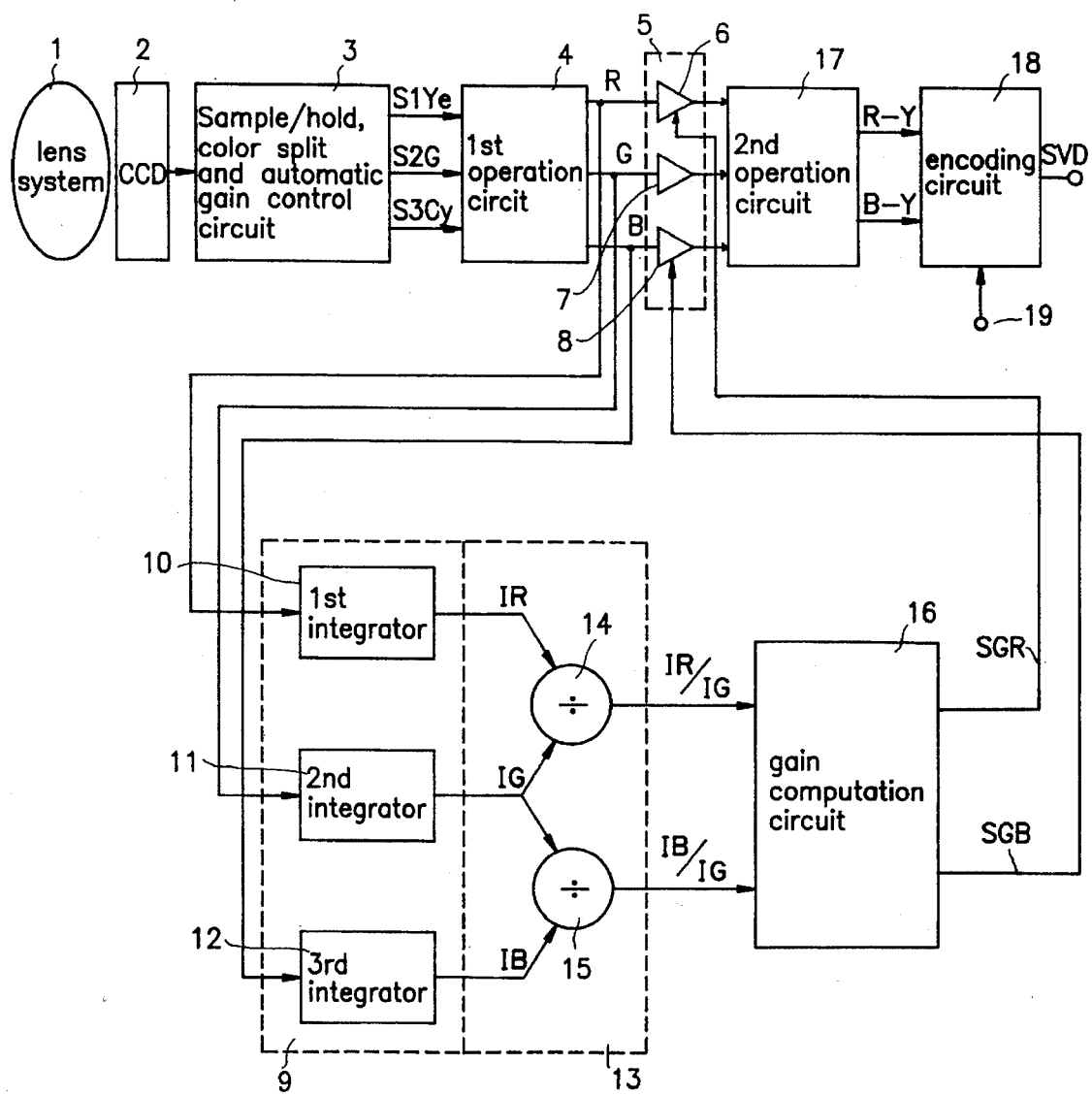
FIG. 1 is a block diagram showing a conventional white-balance adjusting apparatus for a video camera.
Figure 2:
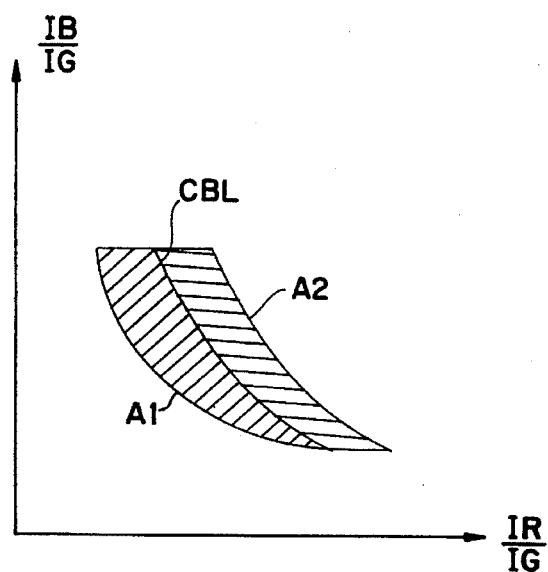
FIG. 2 is a graph showing a white-balance trace region in accordance with the conventional white-balance adjusting apparatus for a video camera shown in FIG. 1.
Figure 3:
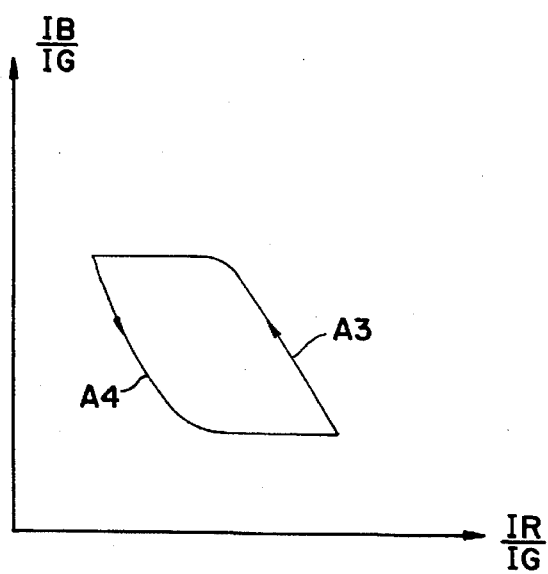
FIG. 3 is a graph showing a hysteresis characteristic in accordance with an integration value ratio of primary color signals according to a change of color temperature of a light source.

The detailed operation and effects thereof will now be explained with reference to FIGS. 4 through 7. The description of the structure which is the same as in FIG. 1 is eliminated.

To begin with, a first integration value ratio IR/IG of an integration value IR of a primary color signal R and an integration value IG of a primary color signal G and a second integration value ratio IB/IG of an integration value IB of a primary color signal B and an integration value IG of a primary color signal G are respectively obtained at the divide circuit 13. Thereafter, the signals of the integration value ratio IR/IG are outputted to a latch 21 of the latch circuit 20, a first comparator 24 of a comparing circuit 23 and a gain computation circuit 16. In addition, the signals of the integration value ratio IB/IG obtained by a second divider 15 are outputted to a second latch 22 of the latch circuit 20, a second comparator 25 of the comparing circuit 23 and the gain computation circuit 16.

The output signals of the integration value ratios IR/IG and IB/IG of the divide circuit 13 are respectively latched at the first and second latches 21 and 22 and then the signals(IR/IG)p and (IB/IG)p which are held for a time of one field are outputted to the comparing circuit 23.

In the first comparator 24 of the comparing circuit 23, the signals of the integration value ratio(IR/IG)p which represent the signals held for a time of one field are inputted into a negative terminal of the comparator 24 and the signals of the integration value ratio IR/IG of a current field outputted from the first divider 14 are inputted to the positive terminal thereof. Thereafter, the first comparator 24 compares the inputted signals. If the signal value of the integration value ratio IR/IG is greater than the signal value of the integration value ratio(IR/IG)p, the first comparator 24 outputs a high signal whereas, if the signal value of the integration value ratio IR/IG is less than the signal value of the integration value ratio(IR/IG)p, the first comparator 24 outputs a low signal. In addition, in the second comparing 25 of the comparator circuit 23, the signals of the integration value ratio(IB/IG)p which are held for a time of one field at the second latch 22 are inputted to a negative terminal thereof and the signals of the integration value ratio IB/IG of a current field from a second divider 15 are inputted to a positive terminal thereof. Thereafter, the second comparator 25 compares values. If the signal value of the integration value ratio IB/IG of a current field is greater than the signal value of the integration value ratio (IP/IG)p, the second comparator 25 outputs a high signal whereas if the signal value of the integration value ratio IB/IG of a current field is less than the signal value of the integration value ratio(IP/IG)p, the second comparator 25 outputs a low signal.

Referring to FIG. 5, the white-balance trace region which is obtained by taking a picture of an object is previously stored in the gain computation circuit 16. As shown therein, the integration value ratio IB/IG is greater than the integration value ratio IR/IG, the color temperature is high. If the integration value ratio IR/IG is greater than the integration value ratio IB/IG, the temperature is low. In addition, the white-balance trace region includes a hysteresis characteristic of the light source. A white-balance trace region α which is defined when the color temperature moves from a high region to a low region and a white-balance trace region β which is defined when the color temperature moves from a low region to a high region, are shown therein.

In addition, referring to FIG. 6, the signals SI1 and SI2 of the comparing circuit 23 comprise four groups. The proper white-balance trace region is selected in the gain computation circuit 16 in accordance with the signals SI1 and SI2 of the comparator circuit 23. For example, if the signal SI1 is high and the signal SI2 is low, a red color component increases and a blue color component decreases, whereby the integration value ratio IR/IG becomes greater than the integration value ratio IB/IG. Accordingly, it means that the color temperature moves from a high region to a low region, so that a region α is selected as a white-balance trace region. However, if the signal SI1 is low and the signal SI2 is high, it means that the color temperature moves from a low region to a high region, so that a region β is selected. If both the signal SI1 and SI2 are high or all low, it means that the color temperature of the light source have no changes, so that a region (α+β) is selected as a balance trace region.

Thereafter, whether or not the signals of the integration value ratios IR/IG and IB/IG outputted from the first and second dividers 14 and 15 are within the white-balance trace region is judged. If the signals of the integration value ratios IR/IG and IB/IG outputted from the first and second dividers 14 and 15 fall within the white-balance trace region, a predetermined gain of a primary red color signal R and a primary blue color signal B is selected to make the ratio of the signals satisfy a condition of "IR/IG=IB/IG= 1" and the gain is applied to the first and third variable gain amplifiers 6 and 8 of the variable gain circuit 5 as control signals SGR and SGB. However, If the signals of the integration value ratios IR/IG and IB/IG outputted from the first and second dividers 14 and 15 do not fall within the white-balance trace region, an automatic white-balance adjusting operation is not performed, and the gain of the third variable gain amplifiers 6 and 8 does not change. Here, the gain of the second variable amplifier 7 of the variable gain circuit 5 is for example set at 1.

Accordingly, the gain of the third variable gain amplifiers 6 through 8 are adjusted in accordance with the control signals SGR and SGB of the gain computation circuit 16 and then the signal level of the primary color signals R, G and B obtained at the first operation circuit 4 form a relation of "R:G:B=1:1:1," so that the correct white-balance adjustment can be obtained thereby. In addition, the primary color signals R, G, and B adjusted at the variable gain circuit 5 are outputted as the color video signals of the NTSC type.

Figure 7:
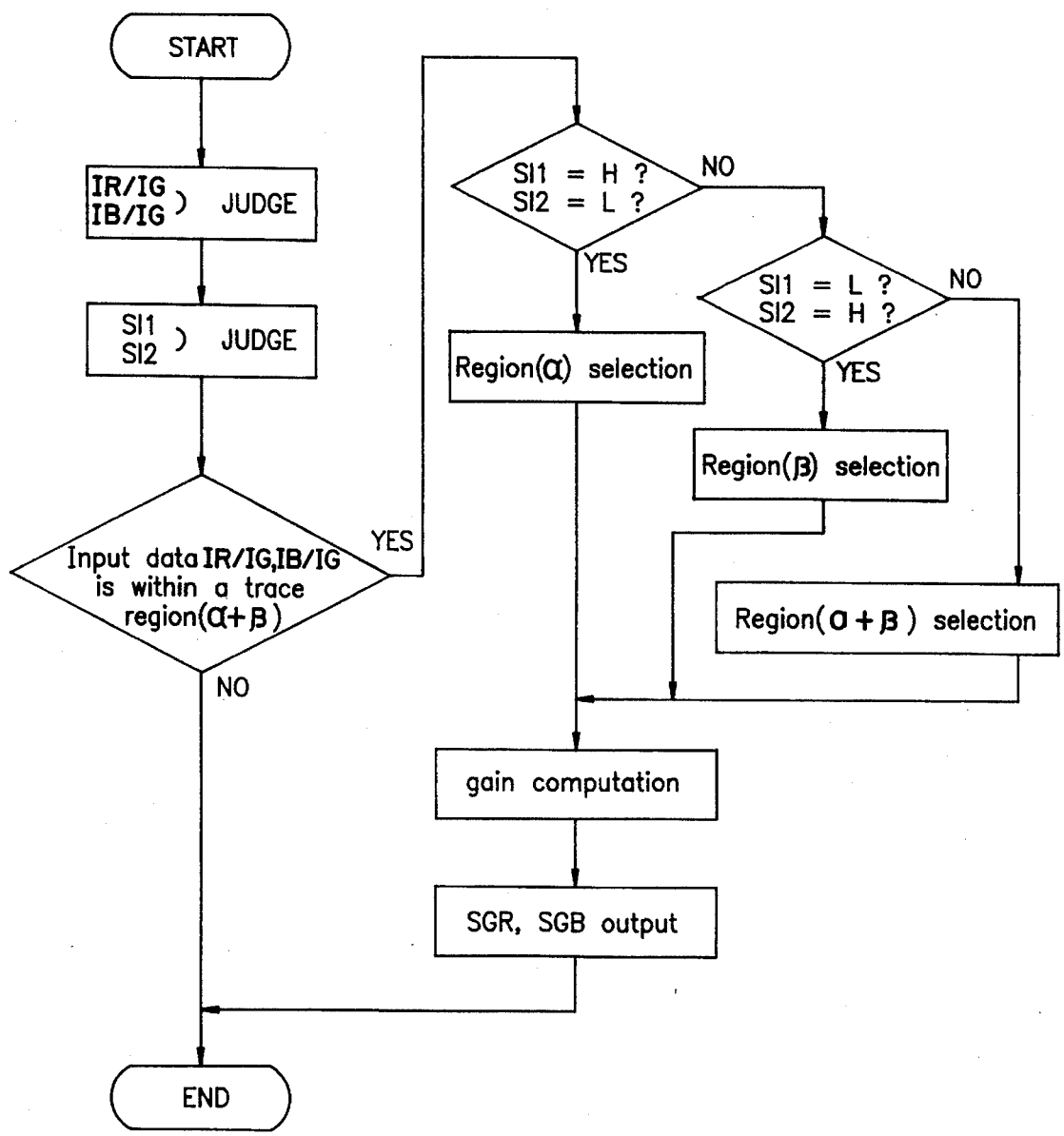
FIG. 7 is a flow chart showing an operation of the embodiment of a white-balance adjusting apparatus for a video camera shown in FIG. 4 according to the present invention.

Referring to FIG. 7, there is shown a flow chart of an automatic white-balance adjusting operation in the case where a microprocessor is used instead of the latch circuit 20, the comparing circuit 23 and the gain computation circuit 16.

When the integration value ratios IR/IG and IB/IG are computed, the signal values of the integration value ratios IR/IG and IB/IG are compared with the signal values of the integration value ratios (IB/IG)p and (IB/IG)/p which represent the signal values of the previous field, respectively. If the signal value of the integration value ratio IR/IG is greater than the signal value of the integration value ratio (IR/IG)p, the signal SI1 becomes high, otherwise the signal SI1 becomes low. In addition, If the signal value of the integration value ratio IB/IG is greater than the signal value of the integration value ratio (IB/IG)p, the signal SI2 becomes high, otherwise the signal SI2 becomes low.

Thereafter, whether or not the signal values of the integration value ratios IR/IG and IB/IG are within a range of the white-balance trace region (α+β) is detected. If the integration value ratios IR/IG and IB/IG are not within the range of the white-balance trace region (α+β), the automatic white-balance adjusting operation is not performed. However, If the integration value ratios IR/IG and IB/IG are within the range of the white-balance trace region (α+β), the signals SI1 and SI2 which are based on the current field value, and the previous field value are respectively detected.

If the signal SI1 is high and the signal SI2 is low, that is, if the color temperature of the light source moves from the high region to the low region, a trace region α is selected and then the gain of the primary colors R and B are respectively computed to meet a condition of "IR/IG=IB/IG=1," so that the gains computed therein are outputted as the control signals SGR and SGB. However, if the signal SI1 is not high and the signal SI2 is not low, whether or not the signal SI1 is low and the signal SI2 is low are respectively detected.

If the signal SI1 is low and the signal SI2 is high, that is if, the color temperature of the light source moves from the low region to the high region, the white-balance trace region β is selected and then the gain of the primary color signals R and B are computed to meet a condition of "IR/IG=IB/IG=1," so that the computed gains are outputted as the control signals SGR and SGB. However, if the signal SI1 is not low and the signal SI2 is not high, in this case, there are no changes in the color temperature of the light source so that the white-balance trace region (α+β) is selected. Then the gains of the primary color signals R and B are computed to meet a condition of "IR/IG=IB/IG=1," and then the computed gains are outputted as the control signals SGR and SGB.

Accordingly, the present invention is directed to permit the white-balance trace region to be variable in accordance with the color temperature change of the light source in consideration that an integration value ratio of the primary color shows a hysteresis characteristic in accordance with the color temperature change. Therefore, the present invention has effects of eliminating a decoloring phenomenon and a poor primary color display which occur when the automatic white-balance adjusting operation is performed by a conventional white-balance adjusting apparatus and a method thereof for a video camera.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A white-balance adjusting apparatus for a video camera, comprising:

divider means for integrating a plurality of primary color signals for a first predetermined time to output a plurality of integration signals and for computing a plurality of integration value ratios from the integration signals, said divider means including an integrator which integrates one of the primary color signals for the first predetermined time and a second predetermined time immediately following the first predetermined time;

color temperature detection means for generating first and second detection signals from the integration value ratios computed by said divider means and detecting a color temperature change of a light source according to the first and second detection signals; and gain computation means for selecting a white-balance trace region in accordance with the color temperature change detected by said color temperature detection means and computing gains of the primary color signals in accordance with a range of the selected white-balance trace region.

2. The apparatus of claim 1, wherein said white-balance trace region includes a first region being selected when a color temperature of the light source moves from a high region to a low region and a second region being selected when the color temperature of the light source moves from the low region to the high region.

3. The apparatus of claim 1, wherein said color temperature detection means includes a plurality of delay means for delaying the integration value ratios for the first predetermined time and a plurality of comparing means for comparing the delayed integration value ratios with current integration value ratios.

4. The apparatus of claim 1, wherein each of said first and second said predetermined times is a one field period.

5. A method of white-balance adjusting for a video camera, comprising the steps of:

generating a plurality of first and second integration signals, said first integration signal representing integration of a primary color signal for a first predetermined time and said second integration signal representing integration of the primary color signal for a second predetermined time immediately following the first predetermined time, said integrations being carried out by a same integrator;

computing a plurality of integration value ratios from the integration signals;

generating first and second detection signals by comparing the integration value ratios;

detecting whether or not each of the computed integration value ratios falls within a predetermined range of a plurality of white-balance trace regions;

selecting a corresponding white-balance trace region based on the first and second detection signals when each of the computed integration value ratios is within the range of the white-balance trace regions; and adjusting a gain of the primary color signal according to the selected white-balance trace region.

6. The method of claim 5, further comprising the step of comparing the integration value ratio of a previous field which is outputted after a third predetermined time with a current integration value ratio.

7. The method of claim 6, wherein each of said first and second predetermined times is a one field period.

8. The method of claim 6, wherein said trace regions include a first region being selected when a color temperature of a light source moves from a low region to a high region and a second region being selected when the color temperature of the light source moves from the high region to the low region.

* * * * *